United States Patent [19]

Coutts et al.

[11] Patent Number: 4,724,161
[45] Date of Patent: Feb. 9, 1988

[54] METHOD FOR MAKING DEAGGREGATED PHOSPHORS

[75] Inventors: Maurice D. Coutts, Plainsboro, N.J.; Stephen S. Trond, Lancaster, Pa.

[73] Assignee: RCA Corporation, Princeton, N.J.

[21] Appl. No.: 907,224

[22] Filed: Sep. 15, 1986

[51] Int. Cl.⁴ .......................... B05D 3/12; B05D 7/00
[52] U.S. Cl. ........................................ 427/57; 427/218
[58] Field of Search ................ 427/57, 64, 68, 218; 210/748

[56] References Cited

U.S. PATENT DOCUMENTS

| 2,292,555 | 8/1942 | Wesch | 250/81 |
| 3,165,269 | 1/1965 | Blackburn et al. | 241/30 |
| 3,720,306 | 3/1973 | Hedler | 209/1 |
| 3,756,400 | 9/1973 | Kammori et al. | 209/1 |
| 4,287,257 | 9/1981 | Ohmatoi et al. | 428/403 |

FOREIGN PATENT DOCUMENTS 3339868 5/1985 Fed. Rep. of Germany .

Primary Examiner—Michael R. Lusignan
Attorney, Agent, or Firm—Eugene M. Whitacre; Dennis H. Irlbeck; Vincent J. Coughlin, Jr.

[57] ABSTRACT

Phosphors are coated and deaggregated by treatment with ultrasonic energy during the coating step. The phosphor aqueous dispersion is continuously passed through an ultrasonic chamber at a rate of flow so as to prevent aggregated phosphor particles from settling out and avoiding deaggregation.

6 Claims, 3 Drawing Figures

METHOD FOR MAKING DEAGGREGATED PHOSPHORS

This invention relates to an improved method for preparing phosphors. More particularly, this invention relates to a method for deaggregating phosphor particles in an aqueous dispersion.

BACKGROUND OF THE INVENTION

In the fabrication or screening of full color luminescent faceplates for entertainment tubes and display tubes, blue, green and red phosphors are deposited consecutively on a glass faceplate to form a cyclic or triad pattern of phosphor dots or lines. In order to obtain high resolution, the pattern must be regular and uniform, with few missing or overlapping phosphor lines or dots. The phosphor materials that are applied must be finely divided and free of aggregated particles. Aggregates do not adhere to the glass faceplate, causing voids or missing dots or lines, or they may overlap an adjacent phosphor line or dot, causing a loss of color purity. These problems are exacerbated in color display tubes, where the average dot diameter is only 5-6 mils rather than the 10-12 mil line diameter used on entertainment tubes. The presence of holes or missing dots or lines require scrapping the resultant screened faceplate or finished tube. Thus the deaggregation of phosphor particles enhances packing density, reduces porosity, and provides resistance to cross contamination of the different adjacent phosphor colors.

It is conventional in the art to form an aqueous dispersion of the phosphor particles and various coating reagents, including: pigments to enhance the color contrast; latex or other binder to promote adhesion of the pigment to the phosphor; and particles of silica or metal hydroxide, such as zinc hydroxide, which impart a negative charge to the phosphor particles, reducing the tendency of the particles to aggregate.

After the phosphor has been coated, it is dried for storage and shipment. In the picture tube factory, the coated phosphor is slurried again, preferably in an aqueous polyvinyl alcohol (PVA) solution or an equivalent photopolymer. The resultant slurry is used in screening the desired pattern onto the faceplates. This PVA slurry is milled to reduce aggregation prior to printing.

However, milling, although effective to reduce phosphor particle size, is undesirable in several respects; it damages the phosphor crystals, reducing luminescent properties such as light efficiency; produces fines or small size particles because milling acts on all size particles equally; some of the coating is removed during milling; and it is a lengthy, up to 8-10 hours, process.

Treatment of phosphor dispersions with ultrasonics to reduce aggregation has previously been tried. However, up till now, this has not been successful. Use of a static containment system such as a bath has allowed aggregated phosphor particles to settle out of suspension and thus they do not get treated by the ultrasonic agitation.

Use of high speed mixing equipment to deaggregate phosphor particles has also been tried but is also unsatisfactory because it results in crystal damage and loss of coating materials.

SUMMARY OF THE INVENTION

We have found the aggregation of phosphor particles can be prevented and a product that does not require milling can be obtained by the treatment of a continuous flow of an aqueous dispersion of phosphor particles and coating reagents with ultrasonic energy. The ultrasonic treatment not only disperses and deaggregates the coated phosphor particles, it does so without removing the coating. When a fresh surface or portion thereof of the phosphor is exposed during deaggregation, it is immediately coated from the coating solution. Unexpectedly, the phosphors produced by the present ultrasonic treatment do not reaggregate after the drying and reslurrying step, so that the subsequently made screening slurry does not have to be milled. The elimination of milling greatly reduces the production of fines or subsize particles which tend to aggregate.

DETAILED DESCRIPTION OF THE INVENTION

Figure 1:
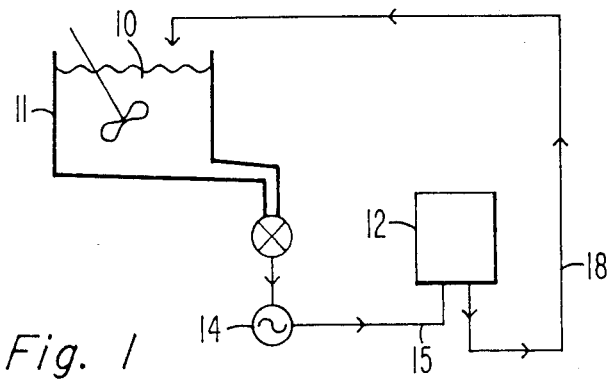
FIG. 1 is a block diagram of the equipment used in the present invention in a recirculating mode.
Figure 2:
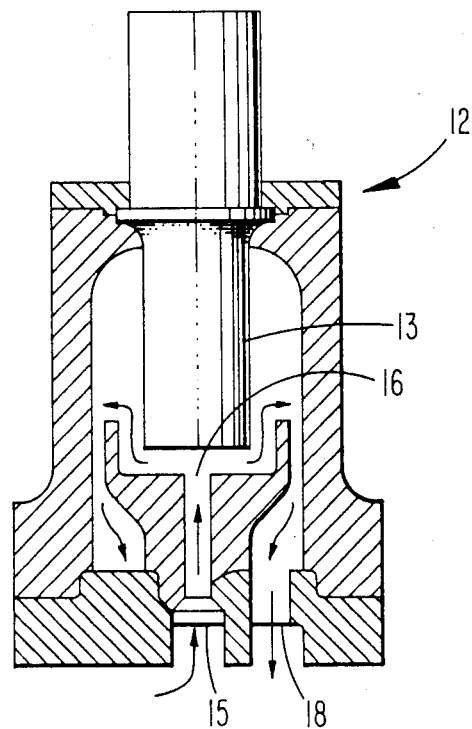
FIG. 2 is a cross sectional view of an apparatus suitable for carrying out the present process.

Referring now to FIGS. 1 and 2, and according to the present invention, an aqueous dispersion 10 containing the phosphor particles and the coating reagents is passed from a reservoir 11 into a conventional continuous flow ultrasonic cell 12. Useful ultrasonic apparatus is conventional and includes a power supply, a converter, a booster (not shown) and the ultrasonic process cell 12 (FIG. 2) which houses a disruptor horn 13. Suitably the cell 12 generates ultrasonic waves operating at a frequency of about 20,000 Hz, although this is not critical. The aqueous dispersion 10 is fed into the process cell 12 by means of a diaphragm pump 14 through an inlet 15 and is forced through the constricted region 16 where it is ultrasonically treated. This configuration of the process cell 12 ensures that all of the phosphor particles are treated and deaggregated in the constricted region 16. The treated dispersion 10 exits the process cell 12 through an outlet 18 where it is cycled back to the reservoir 11. Since the flow of the aqueous dispersion 10 is continuous and there is a constant disturbance of the dispersion 10, the larger phosphor particles do not settle out and thereby avoid being deaggregated.

Figure 3:
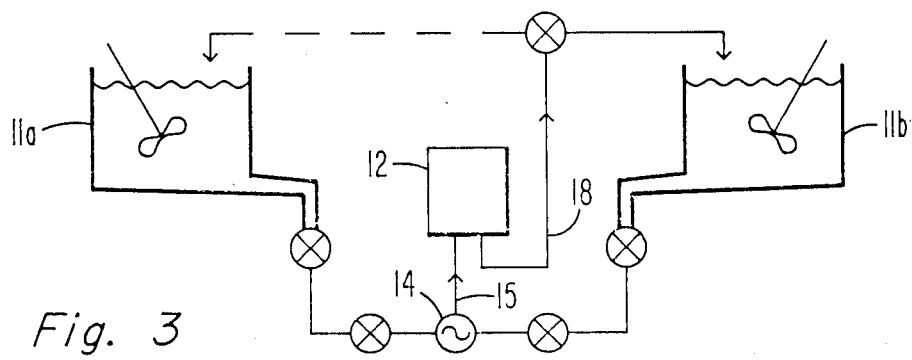
FIG. 3 is a block diagram of the equipment used in the present invention in a multiple pass tank-to-tank mode.

The flow of the dispersion 10 may be recirculated through a single reservoir tank 11, as shown in FIG. 1, or multiple passes through two or more reservoir tanks, 11a and 11b, as shown in FIG. 3, can be employed. A combination of recirculation and tank-to-tank passage also can be employed, with a portion of the aqueous dispersion 10 being continuously cycled and a portion pumped from one reservoir to another. In order to reduce the total processing time, two or more ultrasonic process cells 12 can be used, in series or in parallel, as will be apparent to one skilled in the art.

In operation, a continuous flow of the aqueous dispersion 10 through the ultrasonic process cell 12 is maintained. The aqueous dispersion 10 is fed to the cell 12 through a non-abrasive diaphragm pump 14 at a rate of about 5.5 to 40 liters per minute. The rapid continuous flow feed maintains the phosphor particles in suspension while the ultrasonic treatment is carried out. Rapid deaggregation of the phosphor particles takes place. In practice about 135 kilograms of phosphor can be treated in about five hours using two ultrasonic units. The use of filters in the feed lines is discouraged since they tend to slow down the flow of the aqueous dispersion 10, allowing the larger phosphor particles to settle out and plug the lines. High flow rates also prevent air bubble buildup which can also constrict the flow of the aqueous dispersion 10 and increase particle settling.

The amount of energy given to the aqueous dispersion in watts per unit time can be varied by the constricting inlet orifice 15, the pump pressure and the diameter of the outlet line 18. This energy is directly proportional to the process cell pressure and is inversely proportional to the flow rate. The energy intensity in watts per square centimeter is set by the energy input divided by the diameter of the ultrasonic horn 13. A one inch horn can operate at 800 W/cm$^2$ and a 1.5 inch horn at 355 W/cm$^2$. The ultrasonic treatment is continued until the phosphor particles achieve stable deaggregation. This can be measured by monitoring the average phosphor particle size with time.

By conducting the ultrasonic treatment directly on the aqueous dispersion used to coat the phosphor particles, as deaggregation occurs and particles of phosphor are separated, producing bare surfaces, they are immediately coated by the coating reagents, producing a stable, finely divided phosphor that does not reaggregate.

The invention will be further illustrated by the following Example, but the invention is not meant to be limited to the details described therein.

EXAMPLE 1

A. Preparation of a Deaggregated Pigmented Red Phosphor

An aqueous dispersion of red phosphor was prepared by adding 9.1 kilograms of red phosphor having an average particle size of 8.2 microns in 150 liters of deionized water. A suspension containing 100 ml of water and 13.62 grams of iron oxide pigment and a non-ionic surfactant dispersing agent such as Triton CF-10 commercially available from Rohm & Haas Co. was added. Then 100 ml of a 10% solution of an acrylic emulsion latex binder available from B. F. Goodrich Co. was added and this mixture stirred for 45 minutes. The latex was flocced by adding HCl to a pH of 1.7±0.2 and stirred. The mixture was washed twice with deionized water by siphoning. The pH was then 4.0. While stirring, 454 ml of 22.5% zinc sulphate solution was added, the pH adjusted to 9 with ammonium hydroxide, and the mixture washed once with deionized water. Ultrasonic treatment was begun. While stirring, the aqueous dispersion was recirculated through two parallel ultrasonic units at a rate of about 8 liters per minute. Samples were taken periodically and particle size measured. The results are given in Table I below:

TABLE I

| Time, hours | Particle size, microns |
|---|---|
| 0 | 7.86 |
| 1 | 7.1 |
| 2 | 7.0 |
| 3 | 6.6 |
| 4 | 6.8 |

The mixture was allowed to settle, the water decanted and the phosphor dried at 160° C. The phosphor was sieved through a 400 mesh screen, and had a final particle size of 6.7 microns.

B. Preparation of a Deaggregated Green Phosphor

An aqueous dispersion of green phosphor was prepared by adding 18.2 kilograms of green phosphor having an average particle size of 8.2 microns in 150 liters of deionized water. The coating reagents were added in the following order: 36 ml of a 28% solution of potassium silicate, 59 ml of 30% Ludox-AM, a colloidal silica from the du Pont de Nemours Co., and 150 ml of zinc sulfate (22.5 % solution). The pH was adjusted to about 7.5 with ammonium hydroxide.

This aqueous dispersion was treated ultrasonically as for the red phosphor at a flow rate of about 8 liters per minute. The results of particle size measurement with time is given below in Table II:

TABLE II

| Time, hours | Particle size, microns |
|---|---|
| 0 | 8.18 |
| 1 | 8.2 |
| 2 | 7.2 |
| 3 | 7.1 |
| 4 | 6.94 |

The phosphor was dried and sieved through a 400 mesh screen and had a final particle size of 6.93 microns.

C. Preparation of Screening Slurries

The deaggregated red phosphor as prepared in part A, and the deaggregated green phosphor as prepared in part B, were used to make screening slurries in conventional manner. The phosphors were suspended in deionized water containing surfactants such as L-92 Pluronic of Wyandotte Chemical. A solution of 10% PVA was stirred in, followed by the addition of a sensitizer such as sodium dichromate. No milling or other means of deaggregation was employed.

D. Screening Results

Normal screening was carried out on an entertainment TV faceplate line using conventional milled blue phosphor screening slurry and the above red and green phosphor slurries. Both 20 inch and 25 inch faceplates were used. Table III below compares missing lines data in percent for the screen slurries made as above with conventional milled phosphor slurries of previous production runs.

TABLE III

|  | Previous Run Run | Test Run Run | Previous 3 Mos Average |
|---|---|---|---|
| 20 inch faceplates |  |  |  |
| GREEN PHOSPHOR | 2.41 | 0.73 | 1.17 |
| RED PHOSPHOR | 1.34 | 0.63 | 0.82 |
| Number of Faceplates | 1054 | 983 | 180,000 |
| 25 inch faceplates |  |  |  |
| GREEN PHOSPHOR | 1.25 | 0.44 | 1.00 |
| RED PHOSPHOR | 0.54 | 0.22 | 0.95 |
| Number of Faceplates | 551 | 459 | 90,000 |

The faceplates using the ultrasonically treated phosphors had fewer missing lines because of the decrease in aggregates. In addition, the packing and porosity of the green and red phosphor lines was improved using the ultrasonically prepared phosphors. The green and red phosphor layers were smoother than the standard layers and the line definition equal to or better than standard. The adherence scrap was reduced by better than a factor of two. The light output of the resultant screens was equivalent to standard product.

Although the above example employed only ultrasonically treated red and green phosphors, in actual practice all three phosphors would be ultrasonically treated.

EXAMPLE 2

Each of a red, blue and green display tube phosphor was coated in the following manner: for 22.7 kilograms of phosphor suspended in 150 liters of deionized water, the following materials were sequentially added at about fifteen minute intervals; 45 ml of a 28% potassium silicate solution; 74 ml of 30% Ludox-AM; and 187 ml of 22% zinc sulfate solution. The pH was then adjusted to about 7.5 with ammonium hydroxide. The resultant aqueous dispersions were treated ultrasonically and dried following the procedure of Example 1.

These phosphors were employed to make 13 inch display tubes from screening slurries made similarly to those of Example 1.

The resultant tubes with dot patterns had a greatly reduced total of aggregates and lower number of sag lines resulting in a substantially reduced loss rate for the tubes. The data is given below in Table IV which compares two standard control runs with a run using the above deaggregated phosphors.

TABLE IV

| Runs | Slurry Scrap Items | |
|---|---|---|
| | Sags and Aggregates, % | Missing Dots, % |
| Control Run 1 | 4.28 | 7.12 |
| Control Run 2 | 5.88 | 9.16 |
| Example 2 | 1.39 | 5.18 |

What is claimed is:

1. A process for deaggregating an aqueous dispersion of phosphor particles and coating reagents contained with at least one reservoir which communicates with an ultrasonic process cell, comprising the steps of
    passing said aqueous dispersion into said process cell through an inlet in said process cell,
    forcing said aqueous dispersion through a constricted region of said process cell where said aqueous dispersion is ultrasonically treated and deaggregated, and
    removing said treated aqueous dispersion from said process cell.

2. The process according to claim 1 further including the steps of
    recirculating said treated aqueous dispersion through said reservoir to provide a continuous flow of dispersion to said process cell, and
    continuing the recirculating of said dispersion until the phosphor particles achieve stable deaggregation.

3. The process according to claim 2 further including the steps of
    drying the deaggregated phosphor particles, and
    reslurrying said phosphor particles in an aqueous solution suitable for screening.

4. The process according to claim 1 further including the step of adding a pigment to said aqueous dispersion of phosphor particles and coating reagents prior to the step of passing said aqueous dispersion into said process cell.

5. A process for deaggregating an aqueous dispersion of phosphor particles, a pigment and coating reagents contained within a plurality of reservoirs which communicate with ultrasonic process means, comprising the steps of
    passing said aqueous dispersion into said process means through an inlet therein,
    forcing said aqueous dispersion through a constricted region of said process means where said aqueous dispersion is ultrasonically treated and deaggregated,
    removing said treated aqueous dispersion from said process means,
    recirculating said treated aqueous dispersion through said reservoir to provide a continuous flow of dispersion to said process means, and
    continuing the recirculating of said dispersion until the pigmented phosphor particles achieve stable deaggregation.

6. The process according to claim 5 further including the steps of
    drying the deaggregated pigmented phosphor particles, and
    reslurrying said phosphor particles in an aqueous solution suitable for screening.

* * * * *

UNITED STATES PATENT AND TRADEMARK OFFICE
CERTIFICATE OF CORRECTION

PATENT NO. : 4,724,161

DATED : February 9, 1988

INVENTOR(S) : Maurice D. Coutts et al.

It is certified that error appears in the above-identified patent and that said Letters Patent is hereby corrected as shown below:

Column 5, Claim 1, line 39, "with", first occurrence, should read -- within --.

Signed and Sealed this

Tenth Day of May, 1988

Attest:

DONALD J. QUIGG

Attesting Officer

Commissioner of Patents and Trademarks